US006616432B2

(12) United States Patent
Szczepanski et al.

(10) Patent No.: US 6,616,432 B2
(45) Date of Patent: Sep. 9, 2003

(54) FLUID PUMP MECHANISM FOR USE IN EXISTING HELICAL GEARSETS

(75) Inventors: Gerald S. Szczepanski, Detroit, MI (US); Jonathan M. Adler, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/040,856

(22) Filed: Dec. 28, 2001

(65) Prior Publication Data

US 2003/0124013 A1 Jul. 3, 2003

(51) Int. Cl.[7] ............................................... F04C 15/00

(52) U.S. Cl. ...................... 418/126; 418/201.1; 74/467; 184/6.12; 184/11.1

(58) Field of Search .............................. 418/126, 201.1, 418/96; 74/467; 184/6.12, 11.1, 11.2

(56) References Cited

U.S. PATENT DOCUMENTS

| | | | | |
|---|---|---|---|---|
| 981,862 A | | 1/1911 | Keats | |
| 1,357,301 A | | 11/1920 | Reaugh | |
| 1,418,741 A | | 6/1922 | Stallman | |
| 1,554,081 A | | 9/1925 | Garrett | |
| 2,454,694 A | | 11/1948 | Grebb | |
| 2,645,305 A | | 7/1953 | Roos | |
| 2,743,628 A | | 5/1956 | Scharaffa | |
| 2,817,297 A | * | 12/1957 | Mosbacher | 418/126 |
| 2,885,965 A | | 5/1959 | Haberland | |
| 2,996,999 A | * | 9/1961 | Trautman | 418/126 |
| 3,105,446 A | | 10/1963 | Blomgren, Sr. et al. | |
| 3,263,425 A | | 8/1966 | Rohde | |
| 3,420,185 A | | 1/1969 | Heijnis | |
| 3,532,183 A | | 10/1970 | Shealy | |
| 3,601,515 A | | 8/1971 | Pelizzoni | |
| 3,881,849 A | | 5/1975 | Commarmot et al. | |
| 4,355,964 A | | 10/1982 | Rodibaugh et al. | |
| 4,631,973 A | | 12/1986 | Eley | |
| 4,710,110 A | | 12/1987 | Paulus | |
| 4,745,816 A | | 5/1988 | Horiuchi et al. | |
| 4,879,921 A | | 11/1989 | Asada et al. | |
| 5,391,068 A | | 2/1995 | Uppal | |
| 6,223,858 B1 | | 5/2001 | Ubagai et al. | |

FOREIGN PATENT DOCUMENTS

| | | | | |
|---|---|---|---|---|
| DE | 3023710 A | * | 1/1982 | 418/126 |
| GB | 458379 | * | 12/1936 | 418/126 |
| JP | 57163190 A | * | 10/1982 | F04C/2/14 |

* cited by examiner

*Primary Examiner*—Thomas Denion
*Assistant Examiner*—Theresa Trieu
(74) *Attorney, Agent, or Firm*—Brinks Hofer Gilson & Lione

(57) ABSTRACT

A fluid pump cowling for attachment to at least a pair of helical drivetrain gears having teeth and lands. The cowling has a pair of sidewalls adapted to extend at least partially over the lands of a first of the pair of drivetrain gears and a curved sump wall extending between the sidewalls that corresponds generally to the outermost circumference of the first gear. A sump channel is defined between the sidewalls on the sump wall adjacent a distal end of the sump wall. The sump channel has a generally frustoconical shape and leads to a fluid outlet opening defined in one of the sidewalls. The cowling is positioned such that the teeth of the pair of helical gears mesh in an area in fluid communication with the sump channel to create an area of high fluid pressure upon rotational movement of the gears with a fluid.

23 Claims, 8 Drawing Sheets

FLUID PUMP MECHANISM FOR USE IN EXISTING HELICAL GEARSETS

FIELD OF THE INVENTION

The invention relates generally to the field of gear pumps. In particular, this invention relates to a cowling for use in existing helical gear sets for implementing a fluid pumping mechanism.

DESCRIPTION OF THE RELATED ART

Gear pumps have been utilized to pump fluid from one area to another. In a gear pump, a pressure differential is formed at the points of convergence and divergence of the gear teeth of the intermeshing gears. If fluid is trapped between the gear teeth, the fluid will be forced out of the spaces between the gear teeth by this pressure differential.

Gear pumps typically are only used to pump fluid, and do not make up a part of the drivetrain of a vehicle. The gears used in these gear pumps are not designed to transfer larger amounts of torque, which is necessary in the drivetrain.

The gear pump concept has also been used to keep gears lubricated in a drivetrain. One such system is disclosed in U.S. Pat. No. 2,645,305. One gear in this system is partially located in a chamber of lubricant. When the gears rotate, lubricant is trapped between the gear teeth and a semi-cylindrical element. When the teeth of the gears mesh, the lubricant is forced out of the element into a chamber to provide lubrication to the bearing of one of the gears.

An innovation in gear pump systems has been to utilize some of the gears in the drivetrain, such as the gears in the transmission, to pump fluid to a location other than the bearings of the gears of the gear pump itself. One such system is disclosed in U.S. Pat. No. 3,601,515, wherein a pair of spur gears is provided with a channel element that traps fluid between the teeth of one gear and the element. The fluid travels along the element between the gear teeth to the area where the gear teeth intermesh with the teeth of the corresponding gear. At this location in the channel, an outlet port is provided, and the pressure differential forces the fluid out through the outlet port to another vehicle system.

It is desirable to further improve the pumping force provided by a gear pump utilizing drivetrain gears so as to increase the efficiency of the gear pump without adding more components or increasing package size. It is also desirable to be able to add a pumping mechanism easily to any existing helical gearset. It is also desirable to direct the pump flow in a direction parallel to the axis of rotation of the gears.

BRIEF SUMMARY OF THE INVENTION

In one embodiment of the present invention, a fluid pump cowling for attachment to at least a pair of helical drivetrain gears having teeth and lands is provided. The cowling has a pair of sidewalls adapted to extend at least partially over the lands of a first of the pair of drivetrain gears and a curved sump wall extending between the sidewalls that corresponds generally to the outermost circumference of the first gear. A sump channel is defined between the sidewalls on the sump wall adjacent a distal end of the sump wall. The sump channel has a generally frustoconical shape and leads to a fluid outlet opening defined in one of the sidewalls. The cowling is positioned such that the teeth of the pair of helical gears mesh in an area in fluid communication with the sump channel to create an area of high fluid pressure upon rotational movement of the gears with a fluid.

In a second embodiment of the present invention, a fluid pump cowling for attachment to at least a pair of helical drivetrain gears is provided. The cowling comprises at least two sidewalls and an annular outer wall extending between the sidewalls. A fluid outlet opening is defined in one of the sidewalls, and a sump channel is located on an end of the outer wall. The sump channel extends between the sidewalls, and has a generally frustoconical shape. The sump channel leads to the fluid outlet opening and is tapered to a larger diameter cross-sectionally towards the fluid outlet opening.

In a third embodiment of the present invention, a method for pumping fluid using helical gears of a drivetrain is provided. The method includes the step of providing a cowling with a pair of sidewalls and an outer wall substantially matching the outermost circumference of a first helical gear. A sump channel with a generally frustoconical shape is defined on the outer wall and extends between the sidewalls. The sump channel is tapered to a larger diameter cross-sectionally towards a fluid outlet opening and has an outer wall substantially matching the outermost circumference of a second helical gear. The method includes the steps of mounting the cowling on the helical gears, immersing one of the helical gears at least partially in a fluid bath, rotating the helical gears so as to trap fluid between the teeth of one of the helical gears and the cowling, and directing the fluid into the sump channel and out of said fluid outlet opening.

DETAILED DESCRIPTION OF THE PREFERRED EMBODIMENTS OF THE INVENTION

Figure 1:
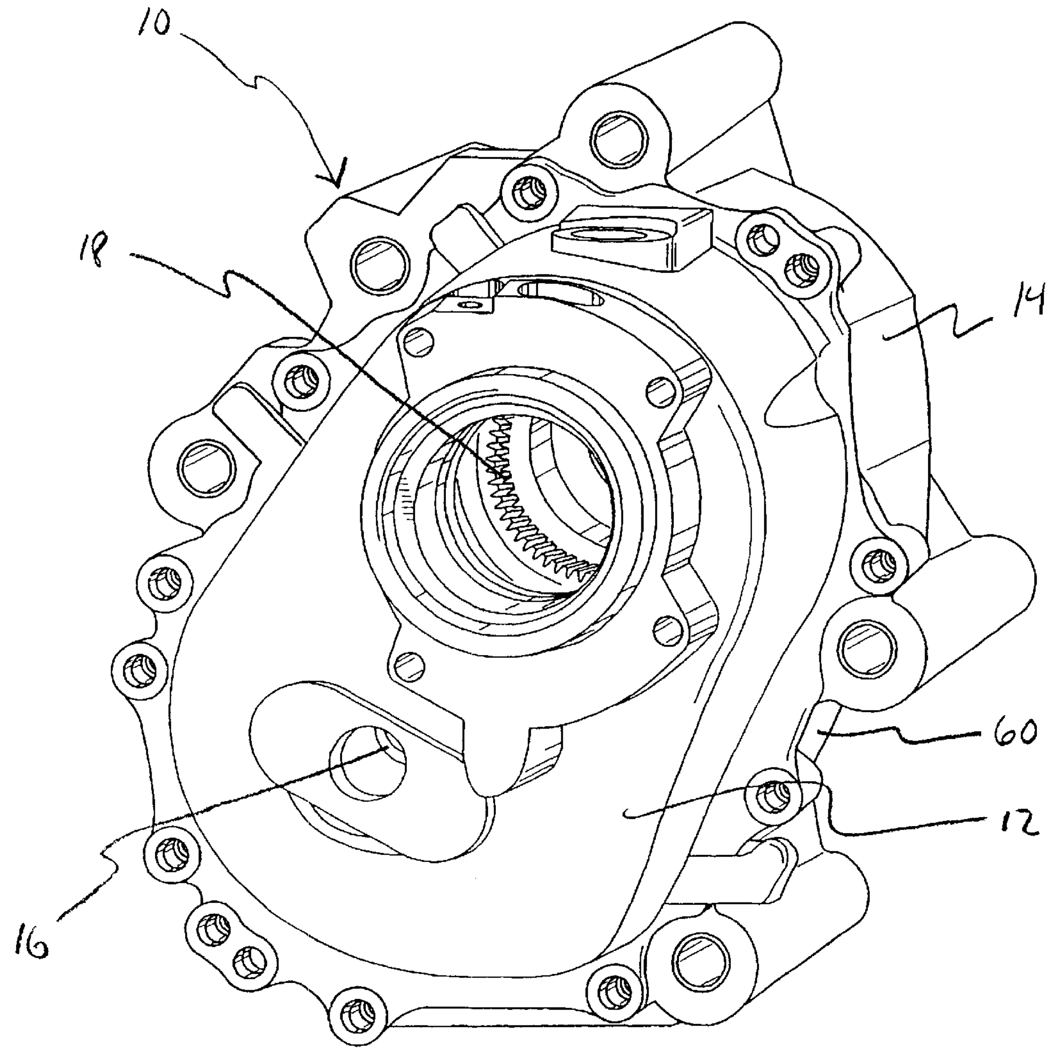
FIG. 1 is a perspective view of a power take-off unit for use with the present invention.
Figure 2:
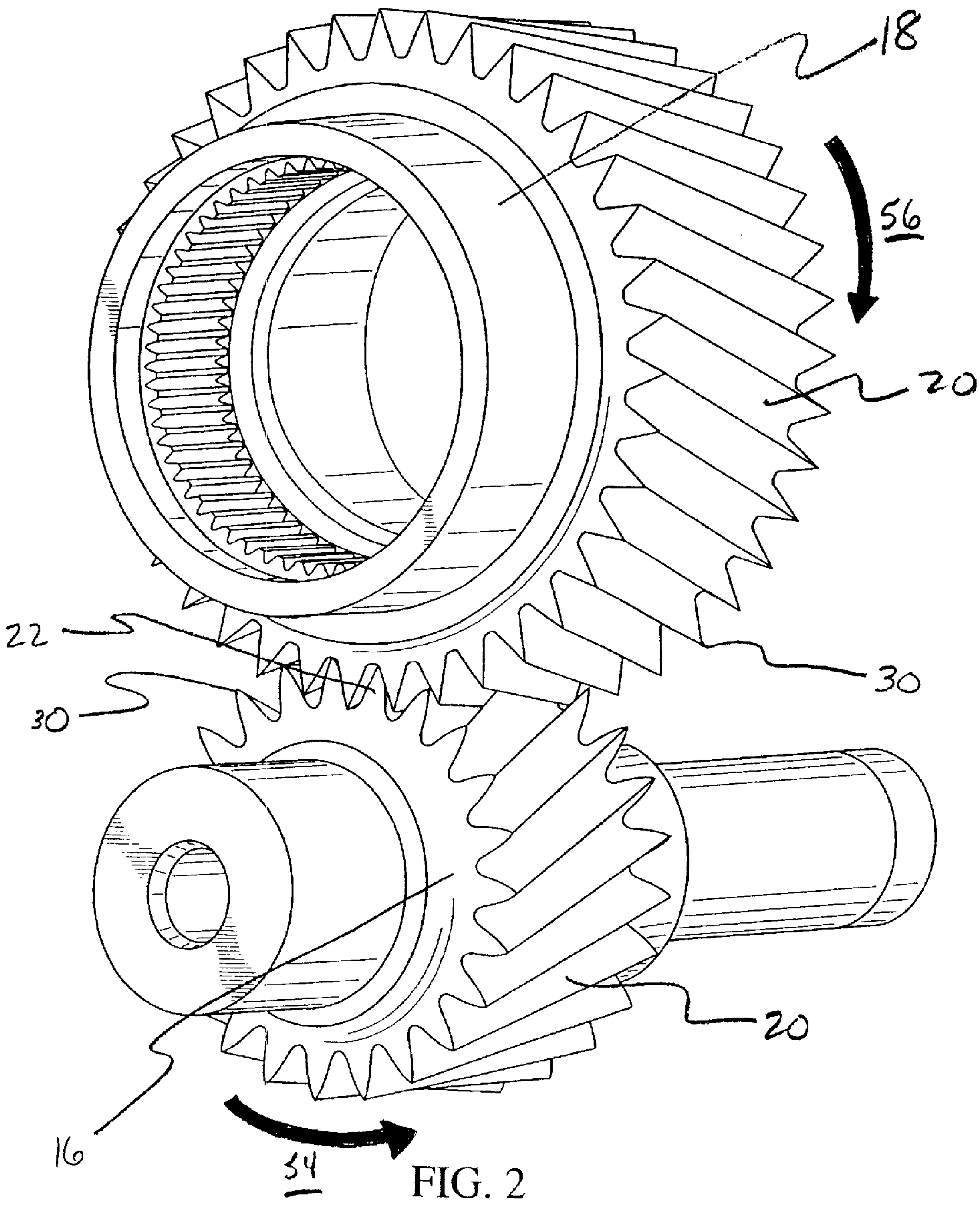
FIG. 2 is a perspective view of a set of helical gears for use with the present invention.

Referring in combination to FIGS. 1 and 2, a power take-off unit 10 for use with the present invention is shown. FIG. 1 shows the power take-off unit 10 with the cover 12 in place over a chamber 14. The cover 12 and chamber 14 preferably have a seal between them to form a sealed casing. This sealed casing allows the interior of the power take-off unit 10 to contain a fluid bath (not shown in FIG. 1). The fluid can be any fluid known in the art useful in a drivetrain system or other vehicular system. Some examples are lubricant or cooling fluid.

The power take-off unit 10 preferably contains a first helical gear 16 and a second helical gear 18. The first 16 and second 18 helical gears are shown in FIG. 2 outside of the power take-off unit 10 for clarity. The teeth 20 of the first 16 and second 18 helical gears preferably intermesh in an area 22 between the first 16 and second 18 helical gears.

Figure 3:
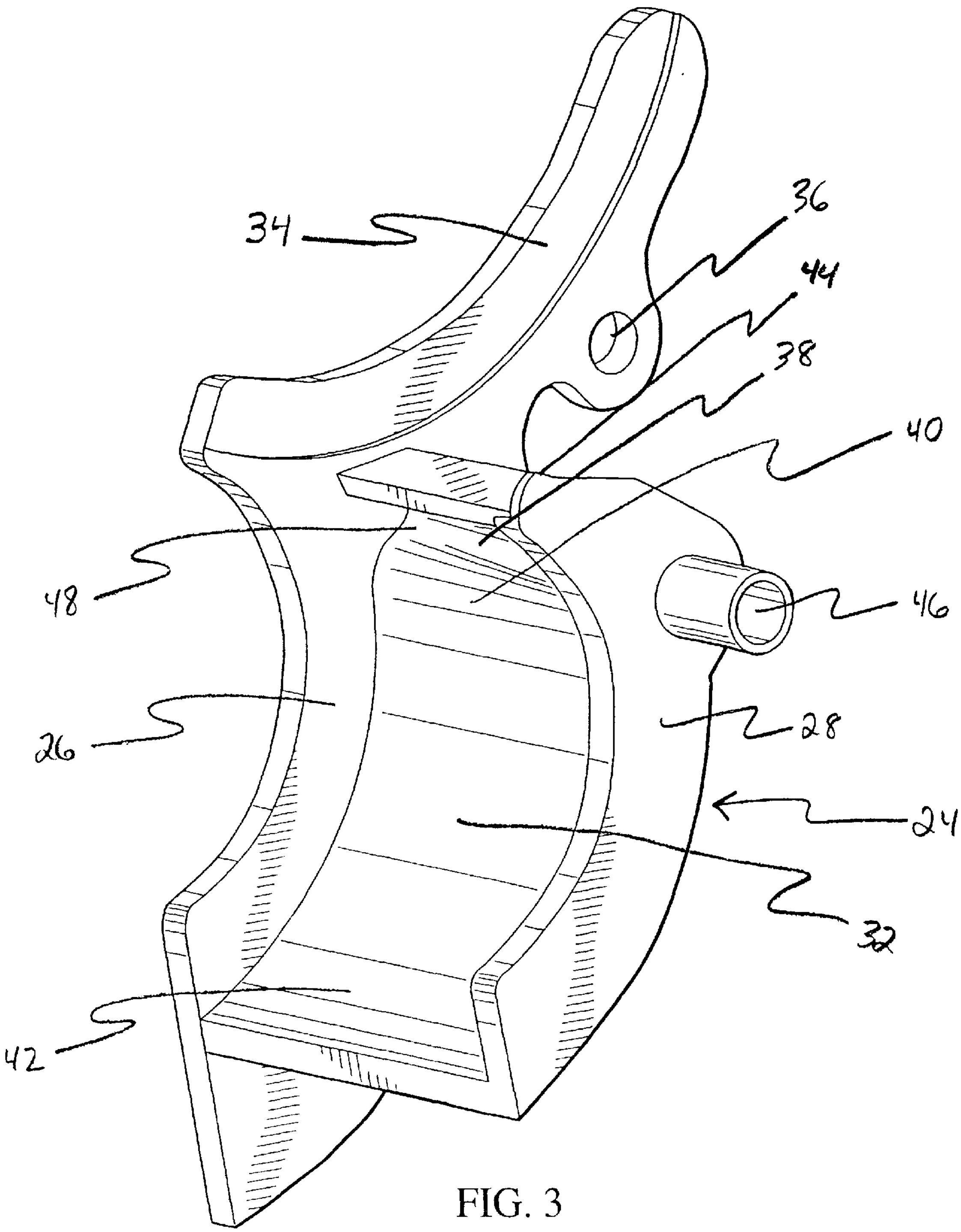
FIG. 3 is a perspective view of the cowling of the present invention.
Figure 4:
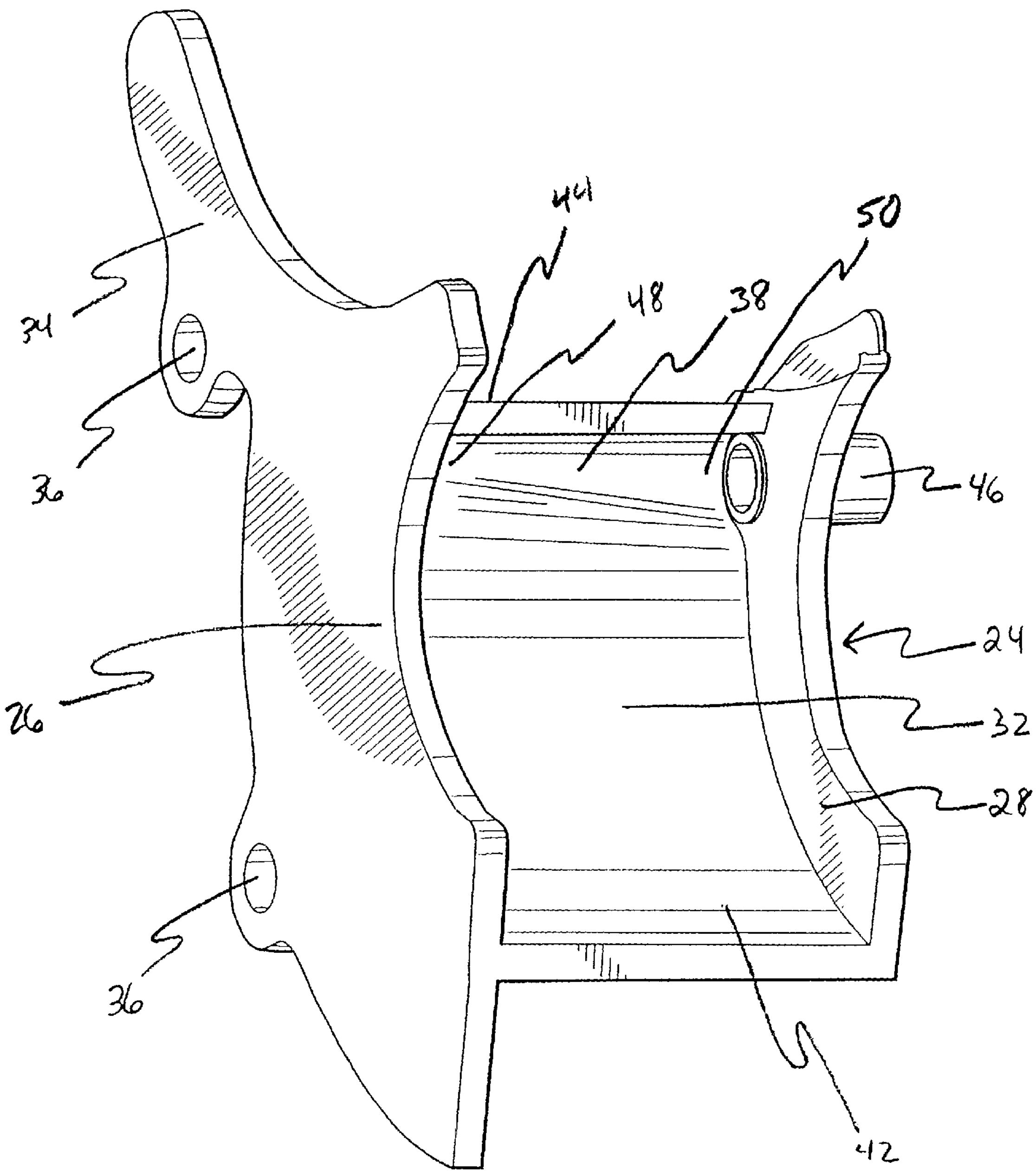
FIG. 4 is a perspective view of the cowling of FIG. 3.
Figure 7:
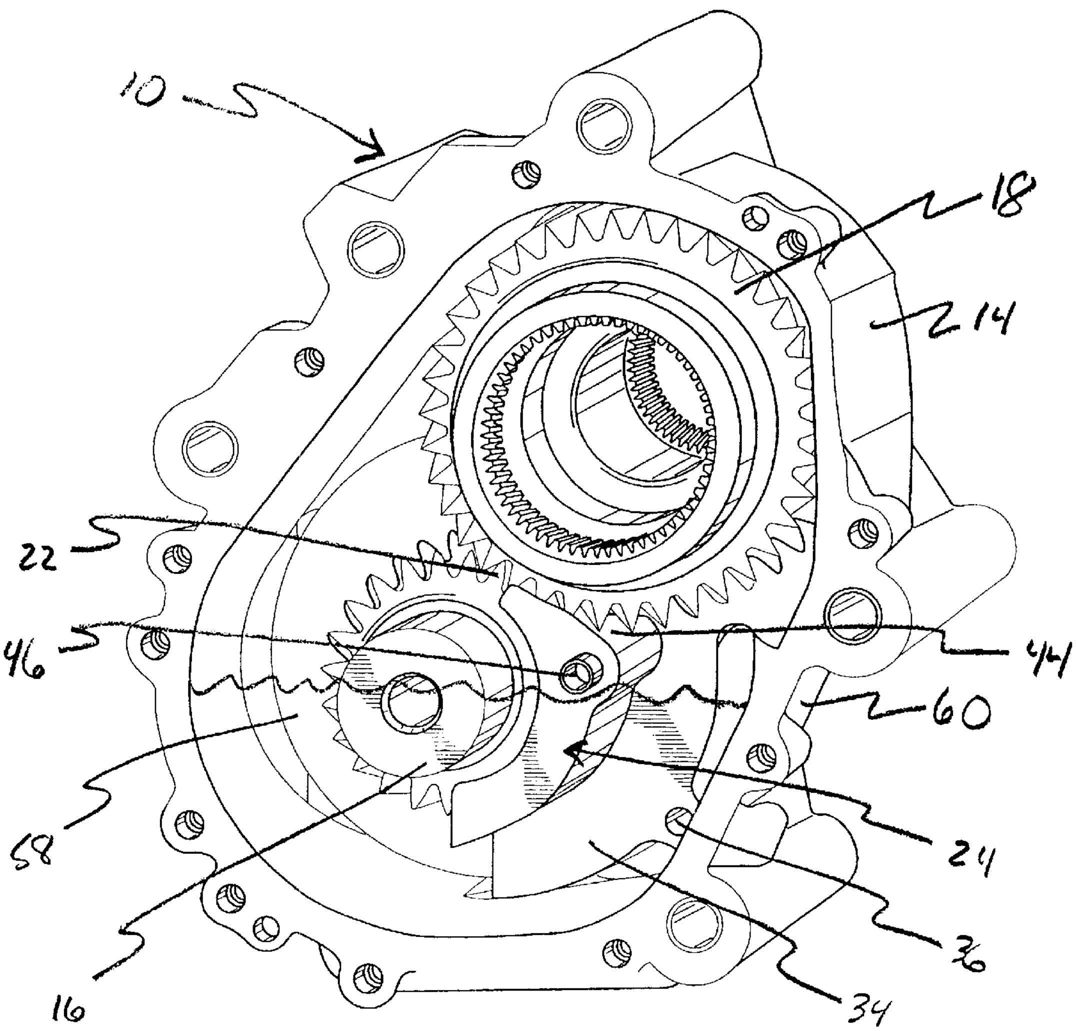
FIG. 7 is a perspective view of the helical gears and cowling of FIG. 3 mounted in the power take-off unit of FIG. 1 with the cover removed.

In the preferred embodiment of the present invention, a cowling is provided in order to maintain the fluid between the teeth 20 of the first helical gear 16. The preferred embodiment of the cowling 24 of the present invention is shown in FIGS. 3 and 4. A pair of generally parallel annular sidewalls 26, 28 are adapted to extend at least partially over the top lands 30 of the gear teeth 20 of the first helical gear 16. A curved sump wall 32 is preferably formed between the two sidewalls 26, 28. The sump wall 32 is preferably of a generally circular shape, so that it substantially matches the outermost circumference of the first helical gear 16. When the cowling 24 is in place over the outer circumference of the first helical gear 16, the top lands 30 of the first helical gear 16 are preferably nearly touching the curved sump wall 32 of the cowling 24. The preferable distance between the top lands 30 of the gear teeth 20 and the curved sump wall 32 is the smallest possible distance possible given the location tolerances of the first helical gear 16 and the curved sump wall 32, such that there is no direct contact between the gear teeth 20 and the curved sump wall 32. An exemplary value is 0.4 mm, but this value could be adjusted depending on the needs of the system. The cowling 24 is preferably of an arc length that covers the entire distance from the fluid bath 58 formed in the chamber 14 to the mesh area 22 of the helical gears 16, 18, preferably about one quarter to one-half of the circumference of the first helical gear 16. The relationship between the fluid bath 58 and the cowling 24 is shown in FIG. 7.

The cowling 24 preferably has a mounting bracket 34 for attaching the cowling 24 to the chamber 14 of the power take-off unit 10. The bracket 34 can take any form known in the art, and the cowling 24 can be attached to the power take-off unit 10 in other ways. For example, holes 36 in the bracket 34 for screws or rivets can be provided, or the cowling 24 can be attached by an adhesive. The cowling 24 could also be shaped such that when the power take-off unit 10 or other drivetrain mechanism is sealed, the cowling 24 is held in place by the walls of the chamber 14 and cover 12 only. The cowling 24 could also be integrally formed as part of the cover 12 or the chamber 14.

The cowling 24 preferably includes an elongated sump channel 38 defined adjacent the distal end 40 of the sump wall 32. The distal end 40 of the sump wall 32 is defined as the end of the sump wall 32 furthest from the area 42 where the lubricant first becomes trapped between the teeth 20 of the first helical gear 16 and the sump wall 32. The sump channel 38 preferably has a generally arcuate cross-sectional shape, and extends outwardly from the curve of the sump wall 32 so as to form an area where fluid can accumulate before being pumped out of the cowling 24. The sump channel 38 also preferably runs adjacent to an outside surface 44 shaped to correspond generally to the outermost circumference of the second helical gear 18. A fluid outlet opening 46 is preferably formed in one sidewall 28 of the cowling 24. The fluid outlet opening 46 is preferably circular to match the shape of the sump channel 38. The fluid outlet opening 46 is preferably substantially aligned with the elongate direction of the sump channel 38 so that it is in fluid communication with the sump channel 38. This alignment allows fluid that has accumulated in the sump channel 38 to exit the sump channel 38 through the fluid outlet opening 46.

The sump channel 38 is preferably tapered such that it forms a generally frustoconical section enlarging towards the fluid outlet opening 46. At a first end 48 of the sump channel 38, the diameter is smaller than the diameter of the fluid outlet opening 46. The sump channel 38 gradually tapers outwardly to a diameter at its second end 50 preferably slightly larger than the diameter of the fluid outlet opening 46. This tapering further increases the efficiency of the mechanism of the present invention by complementing the tendency of the helical gears 16, 18 to drive fluid flow towards the fluid outlet opening 46.

Figure 5:
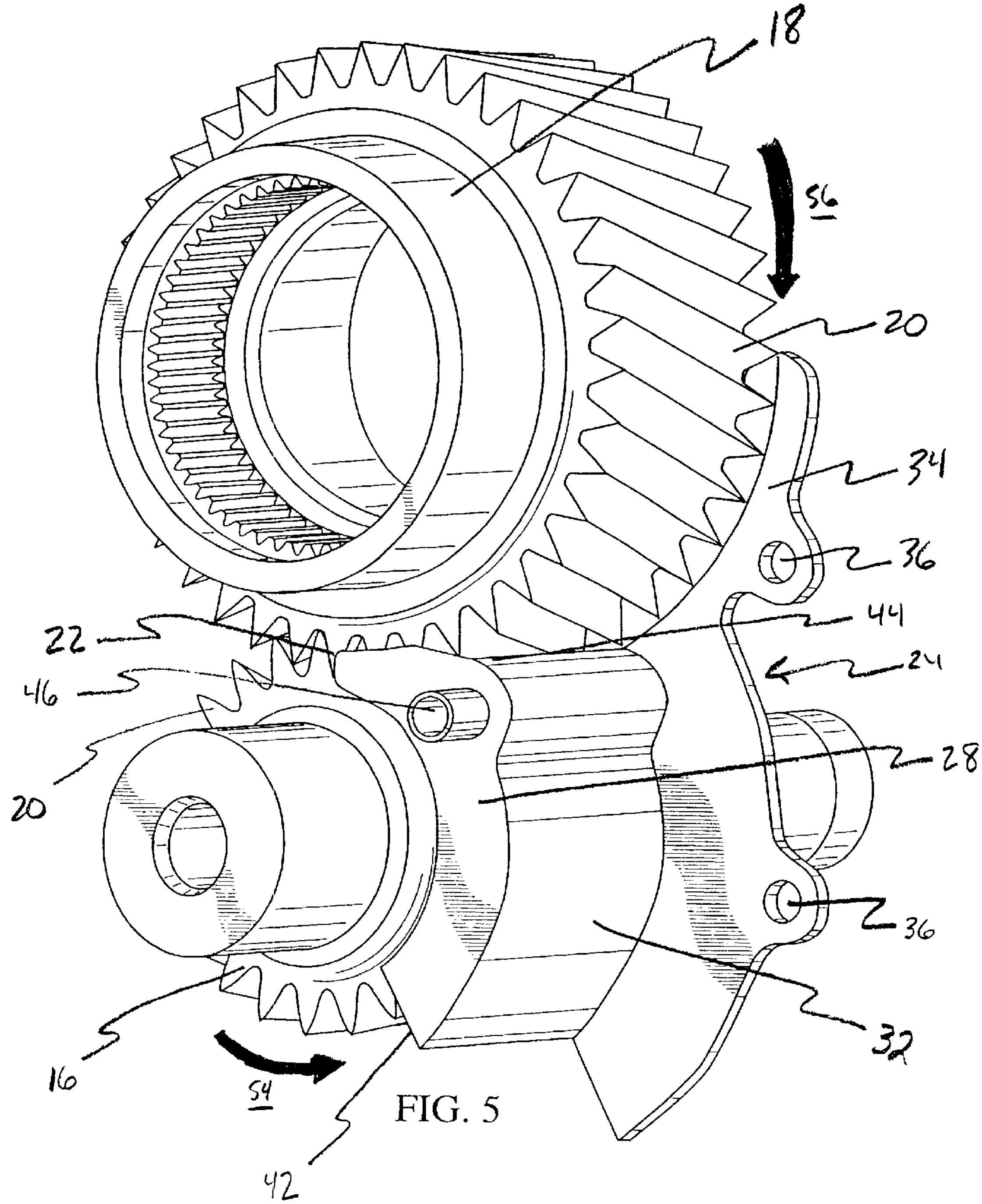
FIG. 5 is a perspective view of the helical gears of FIG. 2, with an embodiment of the cowling of the present invention mounted thereon.
Figure 6:
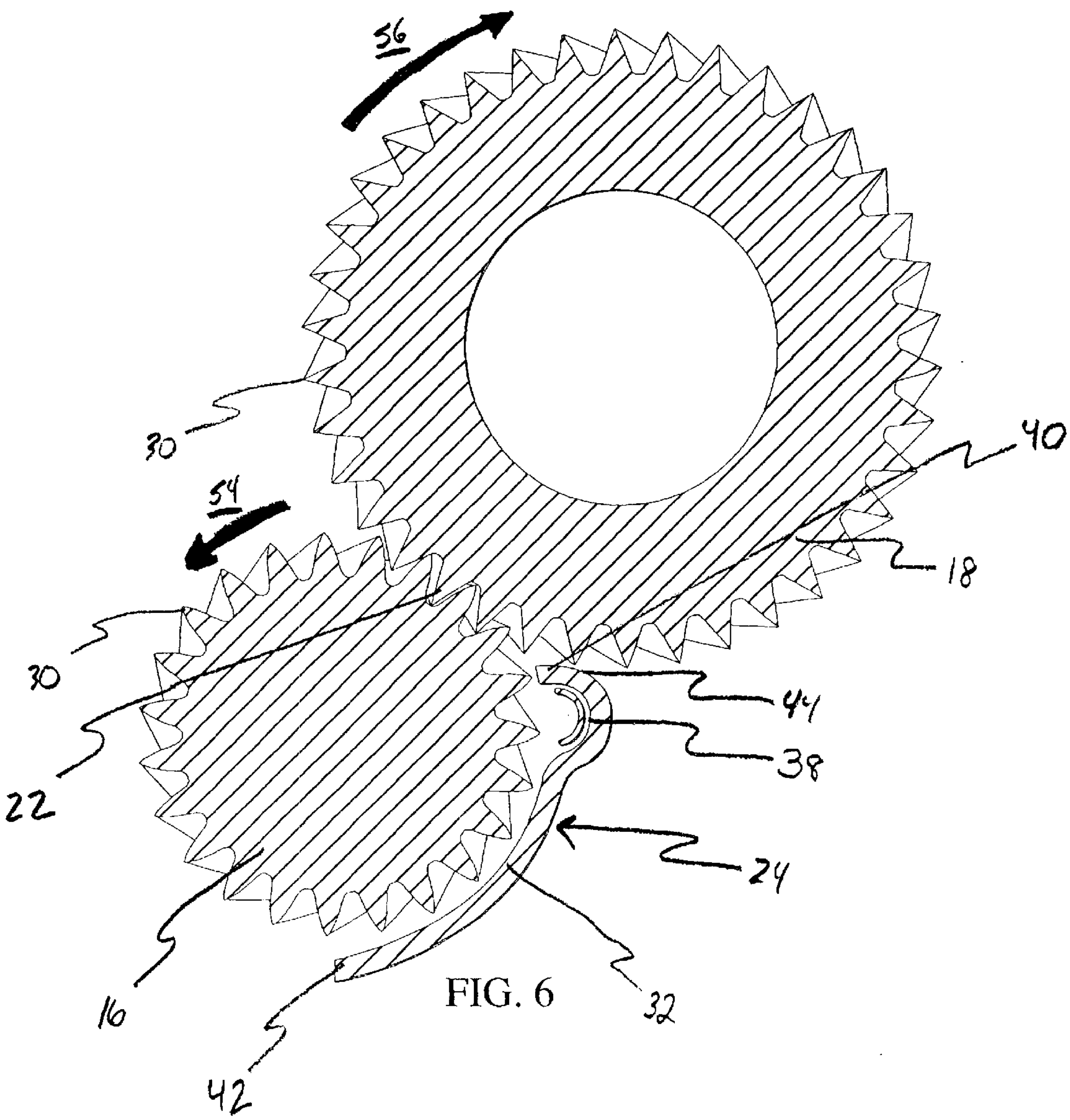
FIG. 6 is a cross-sectional view along line 6—6 of the helical gears and cowling of FIG. 3.

Referring to FIGS. 5–7, the preferable positioning of the cowling 24 of the present invention in a power take-off unit 10 is illustrated. The cowling 24 is preferably positioned around the first helical gear 16, which is preferably the lower gear in the power take-off unit 10. The top lands 30 of the gear teeth 20 of the first helical gear 16 are preferably closely adjacent to, yet not contacting, the sump wall 32, as shown in the cross-sectional view of FIG. 6. The top lands 30 of the second helical gear 18 are preferably closely adjacent to, yet not contacting, the outside surface 44 of the sump channel 38. Rotation of the gears 16, 18 is shown by arrows 54, 56, and the area 22 where the first 16 and second 18 helical gears intermesh is preferably located just past the sump channel 38, in the direction of rotation. A fluid bath 58 is preferably located in the chamber 14 so as to at least partially immerse the first helical gear 16. The fluid bath 58 is preferably positioned such that the teeth 20 of the first helical gear 16 can trap the fluid between the teeth 20 and the cowling 24 upon rotation of the gears 16, 18.

The operation of the preferred embodiment of the present invention will now be described. The cowling 24 of the present invention, when positioned on the first 16 and second 18 helical gears as described above, creates a gear pump utilizing the gears 16, 18 of a standard power take-off unit 10 or other drivetrain gearset. The first helical gear 16 is at least partially immersed in a fluid bath 58, and upon rotation, the teeth 20 of the first helical gear 16 scoop fluid up between the teeth 20. The first helical gear 16 continues to rotate into the cowling 24, and the fluid becomes trapped between the teeth 20, the sidewalls 26, 28, and the sump wall 32 of the cowling 24. Upon continued rotation of the first helical gear 16, the fluid arrives at the area 22 where the first helical gear 16 intermeshes with the second helical gear 18. When the gears 16, 18 mesh together, an area of high fluid pressure is created. Because of the curve of the helical gear teeth 20, this area of high fluid pressure forces the fluid trapped between the gear teeth 20 into the sump channel 38 in a direction toward the fluid outlet opening 46. The tapered shape of the sump channel 38 also increases flow of the fluid toward the fluid outlet opening 46. The increased pressure area causes the fluid to be forced out of the fluid outlet opening 46 where it is carried through a duct or tube (not shown) to any other vehicle system where the fluid is needed.

In this way, the gearsets already present in the vehicle can be used to pump fluid. There is no need for extra pump assemblies, or extra package size added to the components themselves. The fluid outlet opening 46 extends axially from the gears 16, 18 of the power take-off unit 10, which allows for more flexibility in the direction of fluid flow out of the power take-off unit 10. The direction in combination with the curve of the helical gear teeth 20 also improves pumping efficiency. There is no need to install an extended fluid outlet to carry the fluid out from the chamber 14 at a side wall 60 of the chamber 14. The positioning of the fluid outlet opening 46 also allows for a tighter fit between the cowling 24 and the teeth 20 of the second helical gear 18 at the outside surface 44 of the cowling 24. This tight fit creates a more efficient pumping system, since less fluid is able to escape the cowling 24 in areas other than the fluid outlet opening 46.

Figure 8:
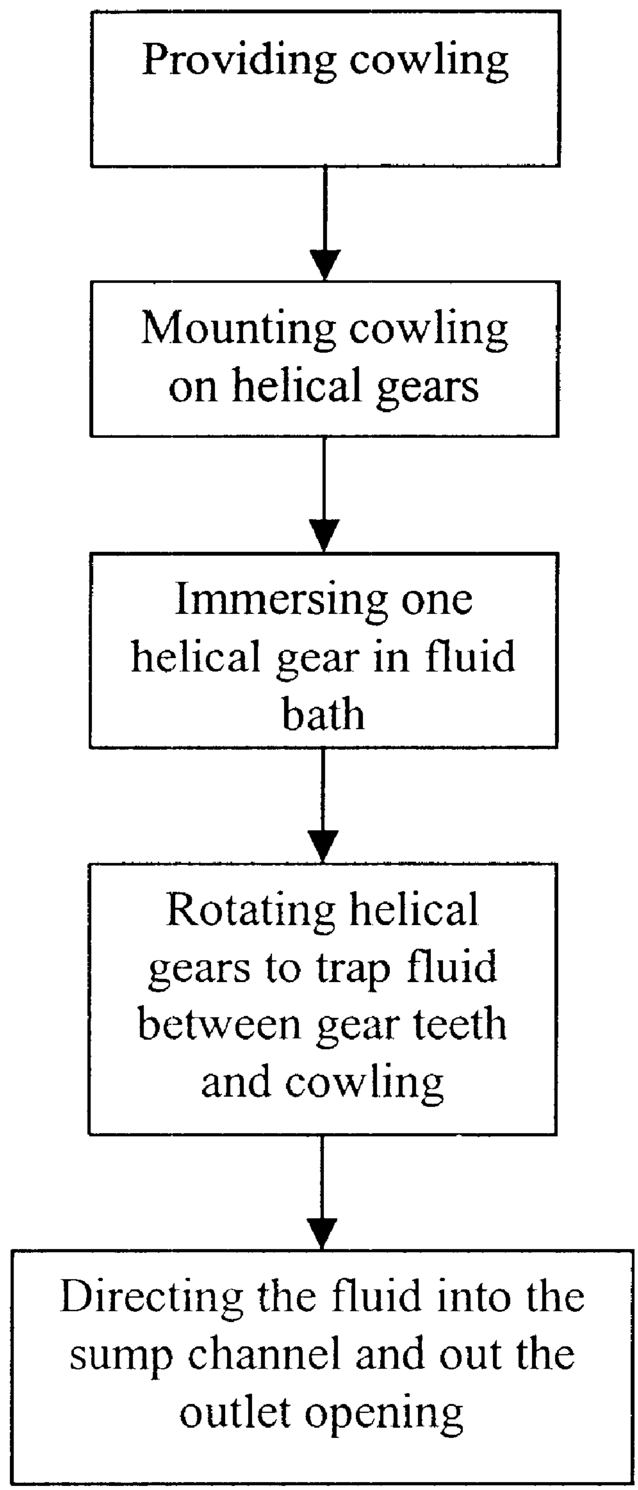
FIG. 8 is a flow chart showing the steps of the method of the present invention.

The present invention is also directed to a method for pumping fluid using the helical gears of a drivetrain, the steps of which are shown as a flow chart in FIG. 8. The first step of the method is to provide a cowling 24 with a pair of sidewalls 26, 28 and an outer wall 32 that substantially matches the outermost circumference of a first gear 16 of a drivetrain mechanism, such as the power take-off unit 10 described above. A sump channel 38 with a generally cylindrical shape is preferably defined in the outer wall 32 of the cowling 24, and the sump channel 38 preferably is tapered to a larger diameter cross-sectionally toward a fluid outlet opening 46 defined in one sidewall 28. The sump channel 38 preferably has an outside surface 44 substantially matching the outermost circumference of the second gear 18. The cowling 24 is preferably mounted onto the helical gears 16, 18 such that the area 22 where the gears 16, 18 intermesh is near the fluid outlet opening 46. One of the helical gears 16 is immersed at least partially in a fluid bath 58 and the gears 16, 18 are rotated. The rotation of the gears 16, 18 traps fluid between the teeth 20 of the first helical gear 16 and the sidewalls 26, 28 and outer wall 32 of the cowling 24. When the trapped fluid rotates to the area 22 where the gears 16, 18 intermesh, an area of high pressure in the fluid is created, and the fluid is forced into the sump channel 38 and out of the cowling 24 through the fluid outlet opening 46. The fluid outlet opening 46 preferably conducts the fluid to another vehicle system through ducts or tubes (not shown) fluidly linked to the fluid outlet opening 46.

The present invention offers many advantages. The cowling 24 can be shaped to match the size of any gear in the drivetrain of a vehicle. The cowling 24 is substantially small, so its addition to an apparatus will not substantially increase packaging size or weight or necessitate the addition of any other parts. There is also no longer a need for the addition of other gear pump mechanisms to pump fluid around the drivetrain system, as existing gearsets are used with this mechanism. This results in reduced packaging size and weight. The tapered shape of the sump channel 38 increases the efficiency of the pump, as well as its pumping power. The combination of helical gears 16, 18 and the tapered shape of the sump channel 38 drive the fluid in an axial direction which is particularly suited to providing lubrication to other parts of the vehicle.

It should be noted that there could be a wide range of changes made to the present invention without departing from its scope. As noted, any size helical gear could be used, and the cowling 24 could be reshaped to match other sizes. The taper in the sump channel 38 could be increased or decreased, depending on the desired pumping power. The sump channel 38 could be formed as a separate component rather than being defined on the sump wall 32. The fluid outlet opening 46 can be of any shape, depending on the duct to which it is fluidly linked. The cowling 24 can be used in any gearset, such as a power take-off unit 10 as described above, or other drivetrain mechanisms, such as the transmission, and could be adapted to be used on more than two gears at once. The mechanism of the present invention can be used to pump any type of fluid, and can pump it to any location of a vehicle. Thus, it is intended that the foregoing detailed description be regarded as illustrative rather than limiting and that it be understood that it is the following claims, including all equivalents, which are intended to define the scope of the invention.

What is claimed is:

1. A fluid pump cowling for attachment to at least a pair of helical drivetrain gears, said gears having teeth and lands, said cowling comprising:

a pair of sidewalls adapted to extend at least partially over said lands of a first of said pair of drivetrain gears;

a curved sump wall extending between said sidewalls, said sump wall corresponding generally to the outermost circumference of said first of said pair of drivetrain gears;

a sump channel defined between said sidewalls on said sump wall adjacent a distal end of said sump wall, said sump channel having a generally frustoconical shape and leading to a fluid outlet opening defined in one of said sidewalls; and said cowling being positioned such that said teeth of said pair of helical gears mesh in an area in fluid communication with said sump channel to create an area of high fluid pressure upon rotational movement of said gears with a fluid.

2. The fluid pump cowling of claim 1, wherein said sump channel has an outside wall corresponding generally to the outermost circumference of a second of said pair of drivetrain gears.

3. The fluid pump cowling of claim 2, wherein said sidewalls are generally parallel.

4. The fluid pump cowling of claim 3, wherein said sidewalls are annular.

5. The fluid pump cowling of claim 4, wherein said sump channel is tapered to a larger diameter cross-sectionally towards said fluid outlet opening.

6. The fluid pump cowling of claim 5, wherein said area of high fluid pressure forces said fluid into said fluid outlet opening.

7. The fluid pump cowling of claim 6, wherein said fluid outlet opening is circular.

8. The fluid pump cowling of claim 7, wherein said first and said second gears are positioned within a sealed casing.

9. The fluid pump cowling of claim 8, wherein said first gear is at least partially immersed within a fluid bath.

10. The fluid pump cowling of claim 9, wherein said cowling is positioned such that said cowling covers said teeth of said first helical gear from an area within said fluid bath to an area where said gear teeth of said first and said second gear mesh.

11. The fluid pump cowling of claim 10, wherein said fluid outlet opening is fluidly linked to a duct that conducts said fluid to another vehicle system.

12. A fluid pump cowling for attachment to at least a pair of helical drivetrain gears, said cowling comprising:

at least two sidewalls;

an annular outer wall extending between said at least two sidewalls;

a fluid outlet opening defined in one of said sidewalls; and a sump channel located on an end of said outer wall and extending between said at least two sidewalls, said sump channel having a generally frustoconical shape and leading to said fluid outlet opening, said sump channel being tapered to a larger diameter cross-sectionally towards said fluid outlet opening.

13. The fluid pump cowling of claim 12, wherein said sidewalls are generally parallel.

14. The fluid pump cowling of claim 13, wherein said sidewalls are annular.

15. The fluid pump cowling of claim 14, wherein said cowling is positioned on said at least two intermeshing helical gears.

16. The fluid pump cowling of claim 15, wherein said outer wall corresponds generally to the outermost circumference of a first gear.

17. The fluid pump cowling of claim 16, wherein said sump channel further comprises an outer wall that corresponds generally to the outermost circumference of a second gear.

18. The fluid pump cowling of claim 17, wherein said sump channel is substantially aligned with the area where the teeth of said helical gears mesh such that an area of high fluid pressure in a fluid is created when said gears are rotated within said fluid.

19. The fluid pump cowling of claim 18, wherein said fluid outlet opening is fluidly linked to a duct that conducts said fluid to another vehicle system.

20. A method for pumping fluid using helical gears of a drivetrain, said method comprising:

providing a cowling with a pair of sidewalls, an outer wall substantially matching the outermost circumference of a first helical gear, and a sump channel with a generally frustoconical shape defined on said outer wall and extending between said sidewalls, said sump channel being tapered to a larger diameter cross-sectionally towards a fluid outlet opening defined in one of said sidewalls, and having an outer wall substantially matching the outermost circumference of a second helical gear;

mounting said cowling on said helical gears;

immersing one of said helical gears at least partially in a fluid bath;

rotating said helical gears so as to trap fluid between the teeth of one of said helical gears and said cowling; and directing said fluid into said sump channel and out of said fluid outlet opening.

21. The method of claim 20, wherein said helical gears are part of a transmission.

22. The method of claim 21, wherein said helical gears are part of a power take-off unit.

23.The method of claim 22, wherein said fluid outlet opening is fluidly linked to a duct that conducts a fluid to another vehicle system.

* * * * *